United States Patent
Maier

(10) Patent No.: US 6,637,477 B1
(45) Date of Patent: Oct. 28, 2003

(54) FILLER NECK FOR THE FUEL TANK OF A MOTOR VEHICLE

(75) Inventor: Bernhard Maier, Gleichenberg (AT)

(73) Assignee: Tesma Motoren und Getriebetechnik GmbH, Sinabelkirchen (AT)

( * ) Notice: Subject to any disclaimer, the term of this patent is extended or adjusted under 35 U.S.C. 154(b) by 0 days.

(21) Appl. No.: 09/936,448

(22) PCT Filed: Mar. 10, 2000

(86) PCT No.: PCT/AT00/00060

§ 371 (c)(1),
(2), (4) Date: Apr. 5, 2002

(87) PCT Pub. No.: WO00/54999

PCT Pub. Date: Sep. 21, 2000

(30) Foreign Application Priority Data

Mar. 12, 1999 (AT) .............................................. 172/99 U

(51) Int. Cl.$^7$ .............................. B65B 1/04; B65B 3/00; B67C 3/00
(52) U.S. Cl. ...................... 141/350; 141/301; 220/86.2; 220/231; 220/360; 137/588; 137/629
(58) Field of Search .......................... 141/59, 301, 302, 141/349, 350; 220/86.2, 231, 360; 137/588, 629

(56) References Cited

U.S. PATENT DOCUMENTS

| | | | | |
|---|---|---|---|---|
| 5,960,839 A | * | 10/1999 | Armesto et al. ............. | 141/304 |
| 6,009,920 A | * | 1/2000 | Palvoelgyi et al. ......... | 141/348 |
| 6,230,739 B1 | * | 5/2001 | Gericke ....................... | 137/588 |

* cited by examiner

*Primary Examiner*—Timothy L. Maust
(74) *Attorney, Agent, or Firm*—Clark Hill PLC

(57) ABSTRACT

A filler neck for the fuel tank of a motor vehicle. The inventive filler neck comprises a housing (12, 14) which has an outer closure (30) that can pivot between a closed and opened position and which has a second closure element (50) that is accommodated inside the housing. Said second closure element is interactively connected to a ventilating valve (16) which, in order to equalize pressure, automatically opens in the instance of excess pressure inside the fuel tank and opens when inserting the dispensing nozzle (100), said dispensing nozzle causing the closure element (50) to swivel open. The inventive filler neck is characterized by a lever (1) which is pivotally mounted on the housing (12). Said lever is actuated by the dispensing nozzle (100) when the same is inserted, and opens the ventilating valve (16) before the dispensing nozzle (100) causes the second closure element (50) to swivel open.

5 Claims, 4 Drawing Sheets

FILLER NECK FOR THE FUEL TANK OF A MOTOR VEHICLE

BACKGROUND OF THE INVENTION

Figure 1:
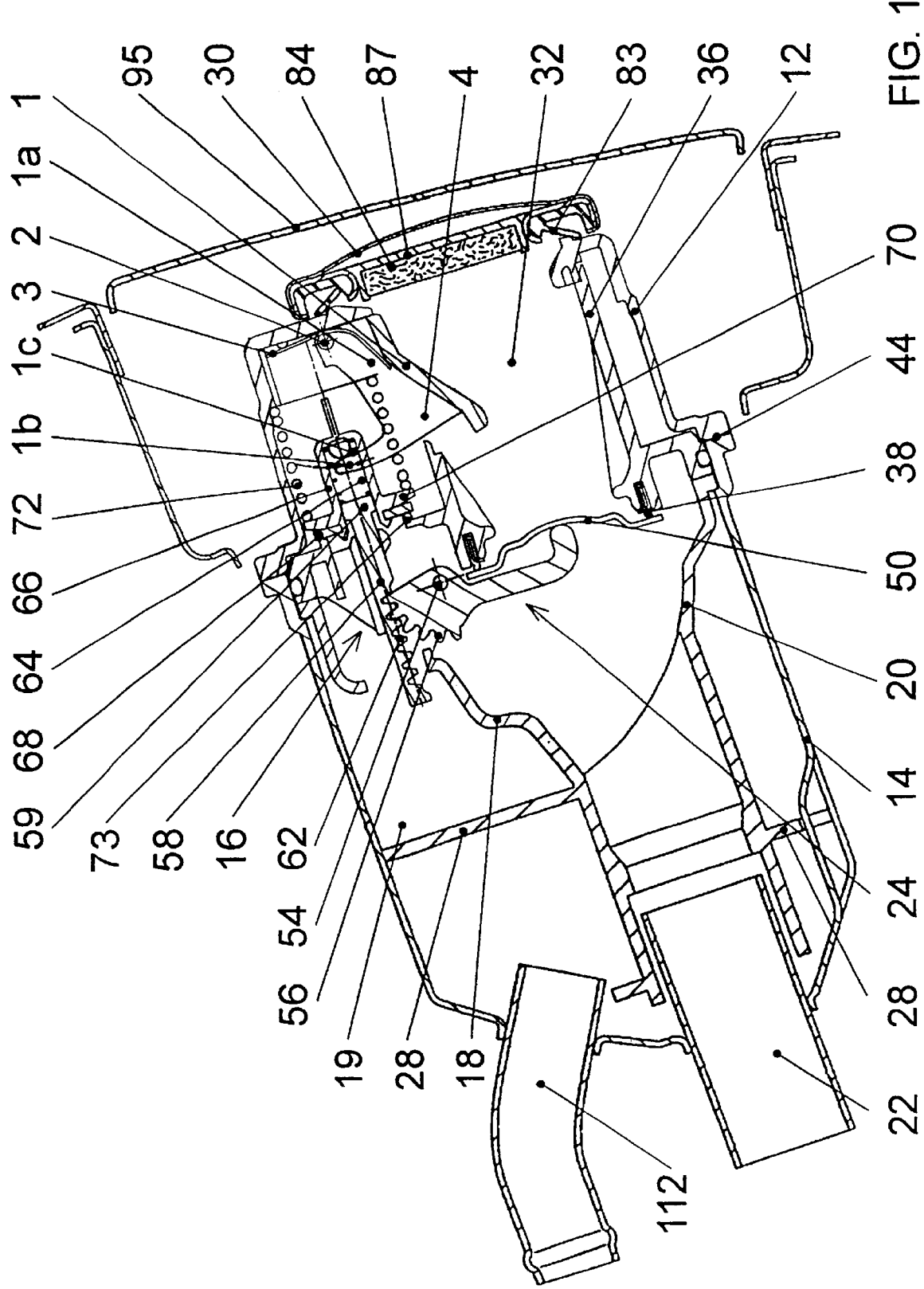

The present invention relates to a filler neck for the fuel tank of a motor vehicle, having a housing with an outer closure which can be pivoted into the closed and open position, and having a second closure element which is accommodated in the housing interior and is operatively connected to a ventilating valve, which, in the event of excess pressure in the fuel tank, is automatically opened, for the purpose of equalizing the pressure, and, when the fuel nozzle which swivels open the closure element is introduced, is opened via the operative connection.

A filler neck of this type is disclosed, for example, in WO 99/03697. This filler neck is one in which, contrary to the designs which are generally customary, a closure which can be removed during opening and can be screwed, in particular, to the filler neck is not provided. In the case of the customary filler necks having separate closures of this type, there is the risk of the user, after the refueling, forgetting to screw the tank closure on again, and of the closures, which are generally placed on the motor vehicle, becoming lost. Then, firstly, dirt can pass from outside into the interior of the tank and, secondly, fuel vapors can escape from the tank.

The filler neck disclosed in WO 99/03697 does not have these disadvantages, since the outer closure is mounted in a manner such that it can be swiveled open and shut on the filler neck itself. This closure is designed in terms of structure in such a manner that, when the closure is closed, air can pass from the outside into the interior through a filter element and from the inside fuel vapors can also escape to the outside. Moreover, this filler neck is provided with a ventilating valve and with a second closure element which is mounted pivotably further inward in the housing of the filler neck. This closure element ensures, in its closed position, a gas-tight seal between the fuel tank on the one side and the filler-neck interior remaining toward the outer closure. If a negative pressure arises in the interior of the tank during the consumption of the fuel, the second closure element can automatically open somewhat, with the result that ambient air can flow into the interior of the tank in order to equalize the pressure. This is ensured via an actuating arm which acts on the closure element and is operatively connected to a comparatively weak spring. If a certain excess pressure arises in the fuel tank, it is ensured that the ventilating valve opens automatically. The ventilating valve is also opened during introduction of the fuel nozzle when the latter, as it is being introduced, swivels open the second closure element. This ensures the required ventilation of the tank when the fuel is being put in. This known filler neck has been well thought through with regard to its functioning and its structure. After the refueling, after the fuel tank has been filled, a little fuel often remains in the interior above the second closure element and collects in particular on the outer side of this closure element. If the fuel nozzle is fully introduced again for renewed filling of the tank, the second closure element is, as explained above, pressed by the fuel nozzle into the open position, in which case the slight excess pressure of the fuel vapor—about 0.15 bar excess pressure—prevailing in the region within the closure element causes the collected fuel residues to spray out of the filler nozzle. This is unpleasant for the person carrying out the refueling.

SUMMARY OF THE INVENTION

The invention has therefore been set the object of improving the known filler neck in this regard and, by means of a simple measure, of ensuring that fuel residues are prevented from spraying out.

According to the invention, the object which has been set is achieved in that a lever is provided, which lever is mounted pivotably on the housing and, actuated by the fuel nozzle when the latter is introduced, opens the ventilating valve even before the fuel nozzle swivels open the inner closure element.

The invention therefore ensures that the slight excess pressure prevailing in the interior of the tank is already reduced before the inner closure element is opened. This effectively prevents residual fuel which is situated above the second closure element from spraying out.

In this connection, the ventilating valve of the filler neck is, as known per se, designed in such a manner that it has a valve part which can be displaced counter to spring force. In order to open the ventilating valve via an actuation of the lever by the fuel nozzle, provision is made for the lever to have two lateral actuating arms which grip under guide parts provided on the valve part. This solution does not have any effect on the other functions of the filler neck; it is simple in terms of structure and can be accommodated, also in a simple manner, in the region of the ventilating valve.

The guide parts provided on the valve part are inwardly directed extensions of tabs provided to the side of the valve part. This structure also ensures that the guide parts cannot have any adverse effect on the other functions and actions of the filler neck. Moreover, these guide parts at the same time form an installation aid by keeping the relatively weak springs which act upon the actuating rod in a tensioned position during fitting of the valve and of the components interacting with said valve.

Furthermore, the ventilating valve is to be completely opened by the inner closure element being swiveled open by the fuel nozzle. A slight opening of the ventilating valve is sufficient in order to compensate for the slight excess pressure in the interior of the tank. For this purpose, those regions of the actuating arms of the lever which interact with the guide parts of the valve part are designed as radial cams which ensure the desired, slight opening.

In order, after the fuel nozzle has been removed, to bring the additional lever back into its starting position and to keep it there, the lever is appropriately acted upon by a spring.

BRIEF DESCRIPTION OF THE PREFERRED EMBODIMENT

Figure 2:
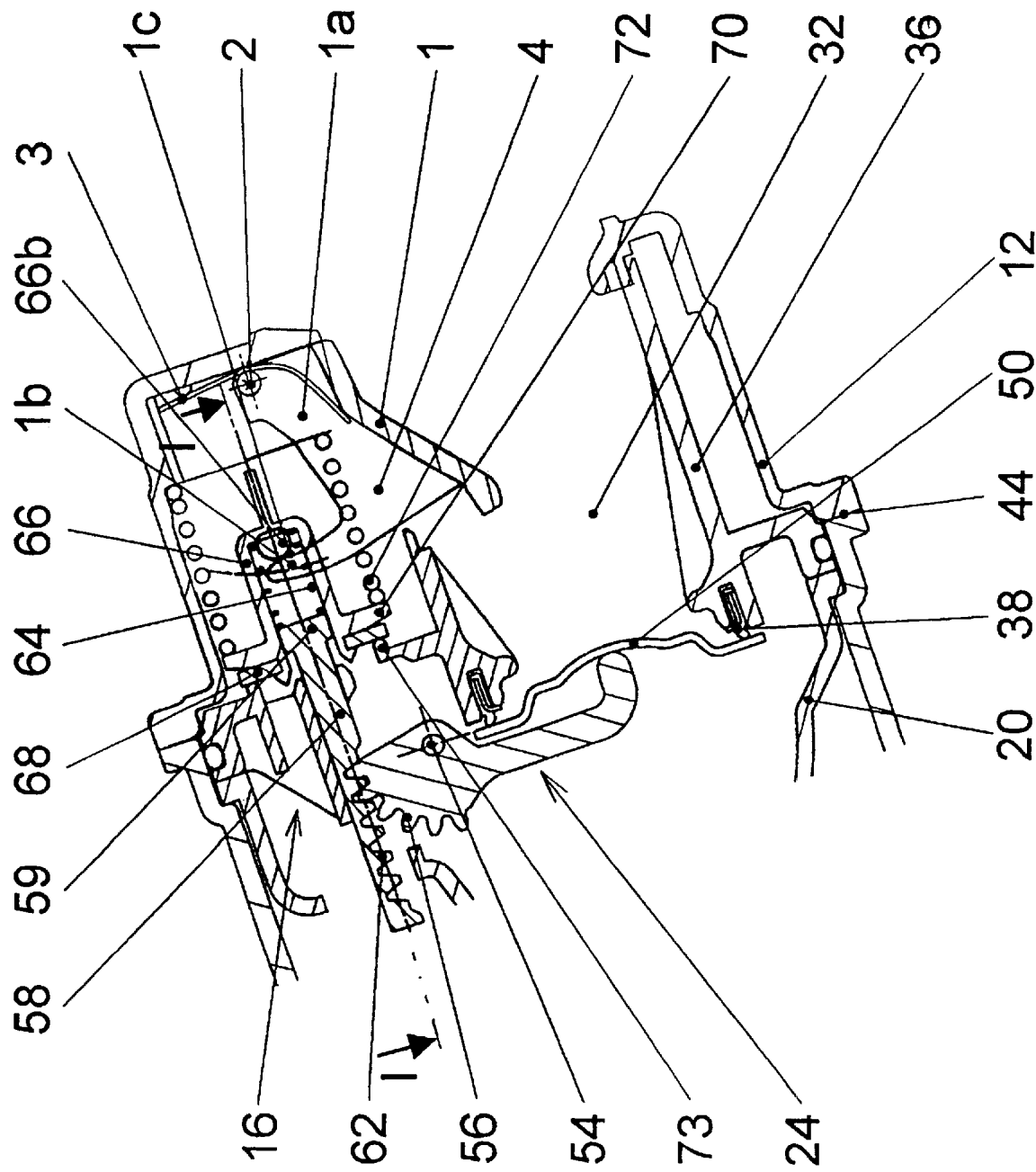
Figure 3:
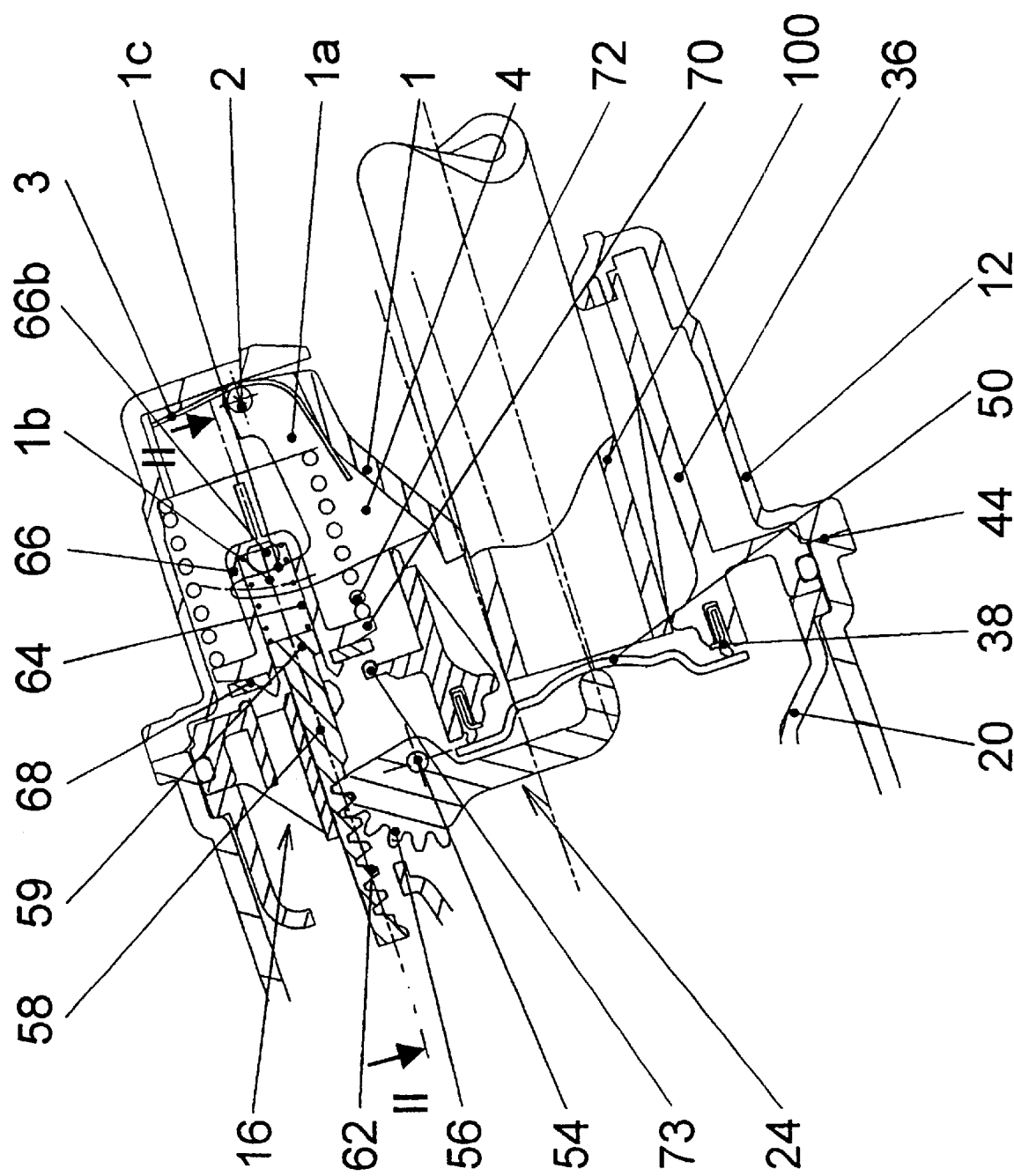
Figure 4:
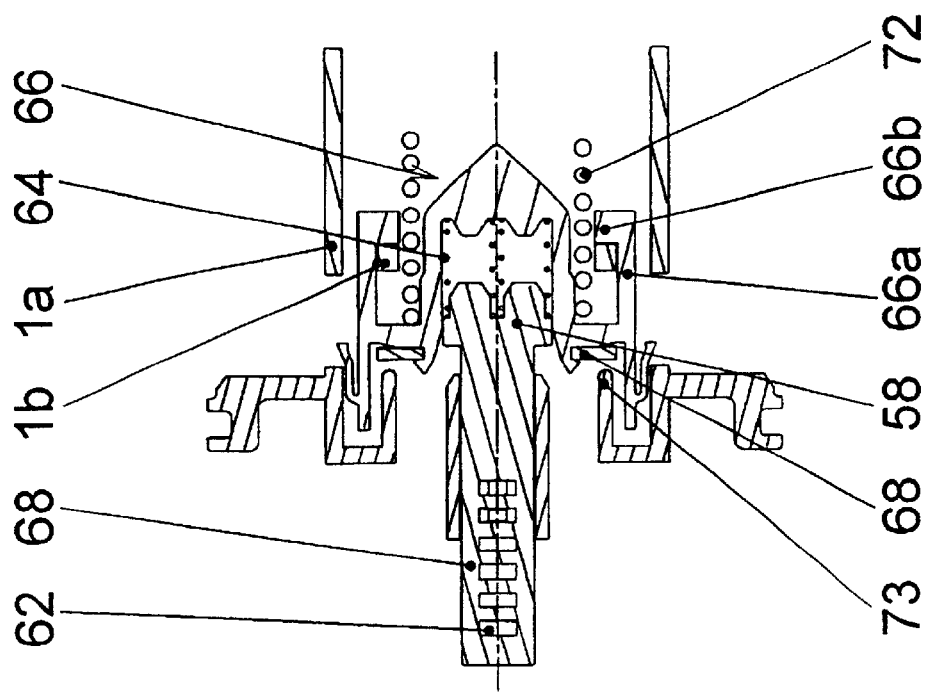
Figure 5:
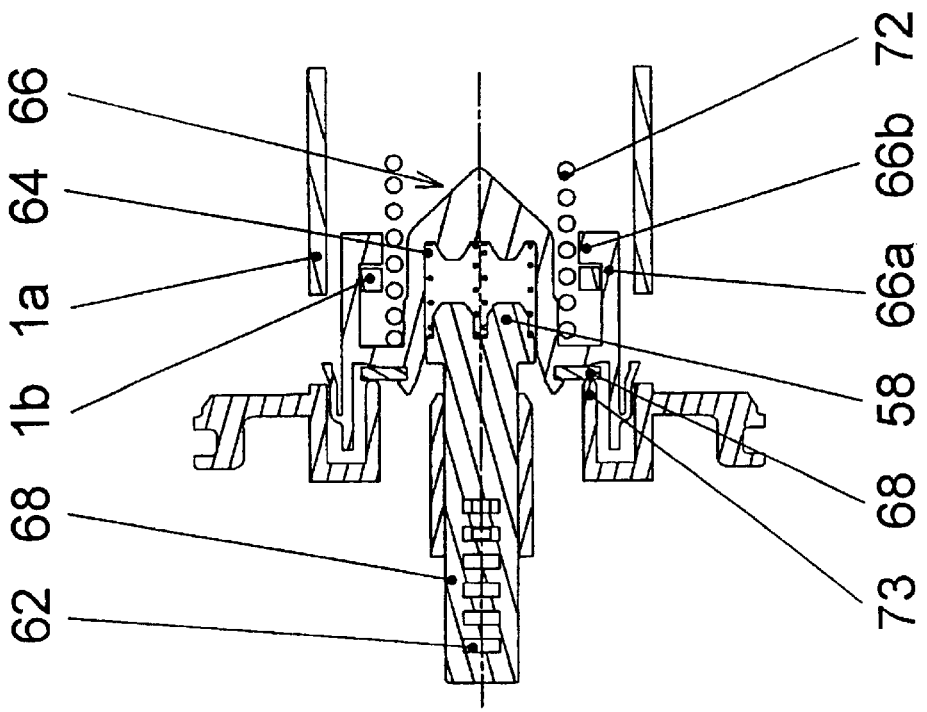

Further features, advantages and details of the invention will be explained in greater detail with reference to the drawing which illustrates an exemplary embodiment. In this case, FIG. 1 shows a longitudinal section through a filler neck designed in accordance with the present invention, in its closed position, FIG. 2 shows the outer subregion of the filler neck from FIG. 1 in a slightly enlarged illustration, FIG. 3 shows the outer subregion of the filler neck from FIG. 1, likewise in longitudinal section, during the introduction of a fuel nozzle, FIG. 4 shows a section along the line I—I from FIG. 2, and FIG. 5 shows a section along the line II—II from FIG. 3. FIG. 4 and FIG. 5 are therefore sections in a plane perpendicular with respect to the plane of projection of FIG. 1 and FIG. 2.

DETAILED DESCRIPTION OF THE PREFERRED EMBODIMENT

With reference to. FIGS. 1 and 2, at this point the basic design of the filler neck will be described, said design corresponding in the main to the design of the exemplary embodiment of a filler neck illustrated in FIGS. 2 to 6 in WO 99/03697.

The filler neck illustrated in FIG. 1 and FIG. 2 has an outer housing part 12, an inner housing part 14 and a ventilating valve denoted in its entirety by 16. The inner and outer housing parts 12, 14 are connected fixedly to each other and in a gas-tight manner at an encircling connecting point 44. The inner housing part 14 has formed on it a spiral-shaped guide 18 having a region 20 which is designed in the manner of a funnel and brings the fuel nozzle, when it is inserted for refueling purposes, into the correct position for filling the tank through the pipe 22. Extensions 28 which extend as far as the outer housing part 14 are provided on the outer region of the spiral guide 18. In this case, the inner and outer housing parts 12, 14 are designed in such a manner that a path 19 for fuel vapor is formed, which path continues via the valve 16, if the valve 16 is opened.

On the outer housing part 12, an outer closure 30 is mounted (in a manner not illustrated) in a manner such that it can be swiveled open and shut. The configuration to this effect can be undertaken as illustrated in particular in FIGS. 3 and 4 of WO 99/03697. During refueling, the closure 30 is opened by swiveling open, it being possible to ensure (in a manner not illustrated here), by appropriate action by a spring, that the closure 30 remains in its opened position. A rubber seal 83 inserted in the inner edge region of the closure 30 ensures that the closure 30 bears readily against the outer housing part 12.

The ventilating valve 16 is operatively connected to an inner closure element 50 which is pressed by an actuating arm 24 against an annularly encircling seal 38 which is accommodated in a part 36 connected to the outer housing part 12. The second, inner closure element 50 acts in the manner of a flap valve. The actuating arm 24 is secured to the housing in a pivotable manner via bolts 54. The closure element 50 is also arranged pivotably here (in a manner which is not illustrated). That region of the actuating arm 24 which is provided on the one side of the pivot axis and is of L-shaped design acts upon the closure element 50; the region on the second side of the pivot axis is designed in the manner of a toothed wheel and is therefore provided with a number of teeth 56 which are in engagement with a toothed strip 62 of an actuating rod 58 and interact therewith.

The actuating rod 58 protrudes with its one end region 59 into a cavity of a valve part 66 and in such a manner forms a piston which can be displaced in this cavity. As is apparent from FIG. 1 in conjunction with FIG. 3, the actuating rod 58 acts upon two helical springs 64 which are supported by their second ends against the closed end region of the cavity of the valve part 66. Via the actuating rod 58, the coiled springs 64 press the actuating arm 64 onto the closure element 50, with the result that the latter is held in its closed and gas-tight position.

On its outer region which points in the interior of the filler neck, the valve part 66 is provided with an encircling flange 70 where the one end of a further coiled spring 72, which has a greater spring constant than the springs 64, is supported. The spring 72 supported by its second end against an abutment connected fixedly to the housing part 12. The spring 72 presses the valve part 66, with the interconnection of a seal 68 which fits in an encircling depression of the valve part 66, against a projection 73 which is provided on the part 36 fixed to the housing, so that a gas-tight seal is provided here.

When the valve 16 is opened, fuel vapors can escape via openings (not illustrated here) in the part 36 fixed to the housing into the interior 32 above the closure element 50.

The closure 30 is constructed in such a manner that air can penetrate into the interior of the filler neck when the closure 30 is closed. For this purpose, a covering 87 provided with holes is provided, and there is inserted on the inner side of the closure 30 a filter 84, by means of which undesirable ingress of dirt is avoided.

Furthermore, a flap 95, which is merely indicated in FIG. 1, is provided on the vehicle itself, which flap can be mounted in a conventional manner on the vehicle in a manner such that it can be swiveled open and shut. In this case, provision may be made via suitable measures, for example such as those which are disclosed in WO 99/0367, for opening and closing of the closure 30 to take place jointly by an actuation of the flap.

As is apparent in particular from FIG. 2 in conjunction with FIG. 4, a lever 1 is also provided which lever has two lateral lever arms 1a which are provided with an actuating projection 1b. The lever 1 is mounted rotatably on the outer housing part 12 by means of bolts 2 or the like.

FIGS. 1, 2 and 4 show the inoperative position of the lever 1. The lever 1 protrudes via a slot 4 in the part 36 fixed to the housing into the interior 32 to an extent sufficient for the lever 1 to have to be actuated when a fuel nozzle is introduced. As is apparent from FIG. 4, each of the two arms 1a grips with its actuating projection 1b under a respective guide part 66b on the valve part 66. The guide parts 66b are formed on the valve part 66, on tabs 66a pointing laterally upward, as inwardly directed extensions. The guide parts 66b are used at the same time, as an installation aid, since they keep the relatively weak springs 64, which act upon the actuating rod 68, in a tensioned position during the fitting of the valve and of the components interacting with the latter.

Those regions of the projections 1b of the lever 1 which are in contact with the two guide parts 66b of the valve part 66 are configured as radial cams 1c which, on introduction of the fuel nozzle 100, cause the lever 1 to pivot, with a slight raising of the valve part 66 counter to the force of the spring 72 and therefore also opening of the valve 16 taking place.

The corresponding position of the lever 1 with the fuel nozzle 100 introduced, before the latter grasps the inner closure element 50, is apparent from FIGS. 3 and 5. An equalization of the pressure between the interior of the tank and the interior 32 can take place through the narrow gap between the valve seal 68 and the projection 73. As a result, the slight excess pressure prevailing in the interior of the tank is reduced before the inner closure element 50 is swiveled open by the fuel nozzle 100. Any fuel residues situated on the outside of the closure element 50 or on the walls of the interior 32 are thus not sprayed outward during opening of the closure element 50.

When the fuel nozzle 100 is removed, the lever 1 is brought, via a leaf spring 3 acting upon it, back into its starting position.

The filler nozzle fulfils various other functions which will be described briefly below.

If fuel is consumed, for example during operation of the vehicle, negative pressure forms in the fuel tank. If the negative pressure reaches a value which exceeds the force of the springs 64, the closure element 50 is automatically pressed counter to the force of the springs 64 into a slightly opened position. Ambient air can now penetrate through the holes in the covering 87 and through the filter 64, so that the negative pressure is equalized, and the closure element 50 automatically closes again under the force of the springs 64. The relatively small movements taking place in this case of the components involved do not cause the ventilating valve 16 to open.

When an excess pressure occurs in the fuel tank, the vapor pressure may become sufficiently great that the relatively strong spring 72 is compressed, and the valve part 66 is therefore displaced and the valve 16 is opened as a result, so that the fuel vapor can escape into the interior 32 and from there to the outside through the closure 30.

If, starting from the position illustrated in FIG. 3, the fuel nozzle 100 is introduced further, the closure element 50 is swiveled open, the actuating rod 58 being displaced via the actuating arm 24, with the helical springs 64 and the spring 72 being compressed, as a result of which the valve 16 opens completely. During filling of the tank, the tank can therefore be ventilated by the filling pipe 22, on the one hand, and also by a separately provided ventilating pipe 112, on the other hand.

The spiral-shaped guide 18 has the effect that under the action of the force of inertia and/or the centrifugal force, liquid particles are separated out of the fuel vapor before they reach the valve 16.

If the fuel nozzle 100 is removed again, the valve 16 first of all closes under the action of the spring 72, and subsequently the closure element 50 is brought into its closed position under the action of the springs 64.

The invention is not restricted to the embodiment which is illustrated and described. Thus, it is also possible, in particular, to provide a refueling vapor recovery system in this filler neck, in which system the fuel vapor escaping through the valve is recycled again via a separate device. As regards a possible design of a system of this type, reference made to the variants disclosed in WO 99/03697.

What is claimed is:

1. A filler neck for the fuel tank of a motor vehicle, having a housing with an outer closure which can be pivoted into the closed and open position, and with a second closure element which is accommodated in the housing interior and is operatively connected to a ventilating valve which, in the event of excess pressure in the fuel tank, is automatically opened, for the purpose of equalizing the pressure, and, when the fuel nozzle which swivels open the closure element is introduced, is opened via the operative connection, characterized in that a lever (1) is provided, which lever is mounted pivotably on the housing (12) and which, actuated by the fuel nozzle (100) when the latter is introduced, opens the ventilating valve (16) even before the fuel nozzle (100) swivels open the second closure element (50).

2. The filler neck as claimed in claim 1, in which the ventilating valve has a valve part which can be displaced counter to the force of a spring, characterized in that the lever (1) has two lateral actuating arms (1*a*) which grip under guide parts (66*b*) provided on the valve part (66).

3. The filler neck as claimed in claim 2, characterized in that the guide parts (66*b*) are inwardly directed extensions of tabs (66*a*) provided to the side of the valve part (66).

4. The filler neck as claimed in one of claims 2 or 3, characterized in that those regions of the actuating arms (1*a*) of the lever (1) which interact with the guide parts (66*b*) are radial cams (1*c*).

5. The filler neck as claimed in one of claims 1 to 4, characterized in that the lever (1) is held in its unactuated position by a spring (3).

* * * * *